United States Patent Office 3,751,407
Patented Aug. 7, 1973

3,751,407
HYDROXYMETHYLATED POLYAZO DYES
Heinz Wicki, Allschwil, Basel-Land, Switzerland, assignor to Sandoz Ltd., Basel, Switzerland
No Drawing. Filed Apr. 15, 1970, Ser. No. 28,974
Claims priority, application Switzerland, May 13, 1969, 7,281/69; Dec. 23, 1969, 19,043/69
Int. Cl. C09b 31/04, 31/18, 33/18
U.S. Cl. 260—169
14 Claims

ABSTRACT OF THE DISCLOSURE

New polyazo dyes produced by coupling a monoazo compound, which is prepared from a diazotized 1-amino-8 - hydroxynaphthalene-monosulphonic or -disulphonic acid or one of its 3'- or 4'-aminobenzoylamino derivatives and a 1,3-dihydroxyhydroxymethylbenzene, with 1 to 2 moles of any desired diazo component, for the dyeing of leather. The dyes have the formula

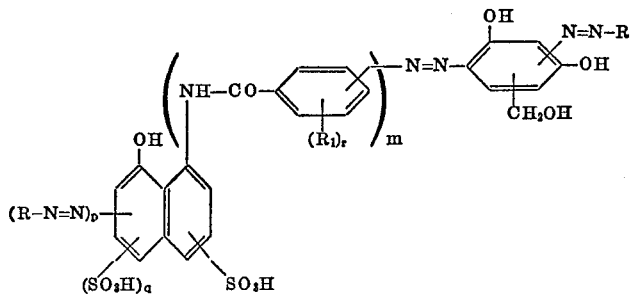

wherein
R is the radical of a diazo component,
$R_1$ is halo, alkyl, substituted alkyl or alkoxy,
$m$ is 0 or 1,
$p$ is 0 or 1,
$q$ is 0 or 1, and
$r$ is 0 or 1.

---

This invention relates to new polyazo dyes of high quality which bear as coupling component a 1,3-dihydroxy-hydroxymethylbenzene compound and are highly suitable for the dyeing and printing of leather. They are produced by coupling a monoazo compound, which is prepared from a diazotized 1-amino-8-hydroxynaphthalene-monosulphonic or -disulphonic acid or one of its 3'- or 4'-aminobenzoylamino derivatives and a 1,3-dihydroxy-hydroxymethylbenzene, with 1 to 2 moles of a freely selected diazo compound.

More specifically this application relates to compounds of the formula

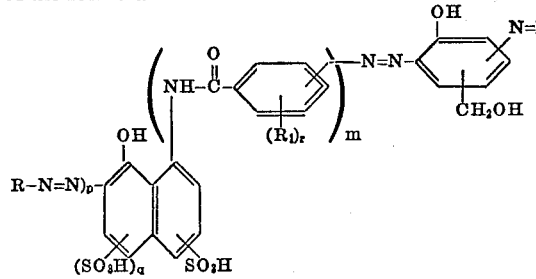

wherein
each R is independently phenyl, substituted phenyl, substituted anilinophenyl or sulfonaphthyl, wherein each substituent of substituted phenyl is independently halo, nitro, cyano, carboxy, sulfo, alkyl, substituted alkyl, alkoxy, hydroxy, alkylamino, phenylazo, 4-sulfophenylazo, naphthylazo, diphenylazo, sulfamoyl, substituted sulfamoyl, carbamoyl, substituted carbamoyl, alkylsulfonyl, phenylsulfonyl or naphthylsulfonyl and each substituted phenyl independently has 1 to 3 substituents, and each substituent of substituted anilinophenyl is independently nitro, carboxy, sulfo or lower alkyl and each substituted anilinophenyl independently has 1 to 4 substituents, wherein each substituent of substituted alkyl is independently halo, cyano, hydroxy, phenyl or naphthyl and each substituent of substituted sulfamoyl and substituted carbamoyl is independently alkyl, phenyl or naphthyl, and wherein each alkyl, alkoxy and alkyl chain of substituted alkyl, alkylamino and alkylsulfonyl independently has 1 to 6 carbon atoms,
$R_1$ is halo, alkyl, substituted alkyl or alkoxy, wherein alkyl, alkoxy and the alkyl chain of substituted alkyl have 1 to 3 carbon atoms and each substituent of substituted alkyl is independently halo, cyano, hydroxy, phenyl or naphthyl,
$m$ is 0 or 1,
$p$ is 0 or 1,
$q$ is 0 or 1, and
$r$ is 0 or 1,
with the proviso that when $m$ is 1 the ((R-azo)-hydroxymethyl-2,4-dihydroxyphenyl)azo group is meta or para to the $$-NH-\overset{O}{\underset{\|}{C}}-$$

group.

More particularly, it relates to compounds wherein
each R is independently phenyl, substituted phenyl, 4-(4-sulfophenylazo)phenyl, substituted 3 - anilinophenyl, substituted 4 - anilinophenyl or monosulfonaphthyl, wherein each substituent of substituted phenyl is independently chloro, bromo, nitro, carboxy, sulfo, methyl, methoxy or hydroxy and each substituted phenyl independently has 1 to 3 substituents, and each substituent of substituted 3-anilinophenyl and substituted 4-anilinophenyl is independently nitro, carboxy, sulfo or methyl and each substituted 3-anilinophenyl and substituted 4-anilinophenyl independently has 1 to 4 substituents.

Good dyes of this type correspond to the formula

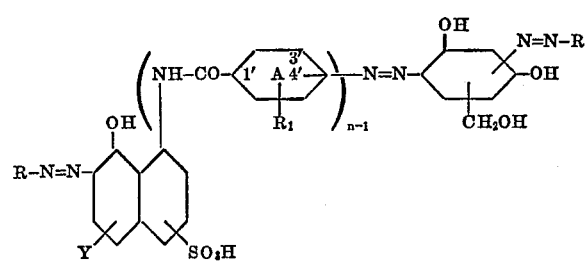

where $n$ stands for 1 or 2, $R_1$ for hydrogen, halogen or optionally substituted alkyl or alkoxy, Y for hydrogen or the sulphonic acid group and R, in each instance, for the radical of any desired diazo component.

The radical of the diazo-dihydroxy-hydroxymethylbenzene compound may be attached to the 3'- or 4'-position of the ring A.

Equally good dyes are those of the formula

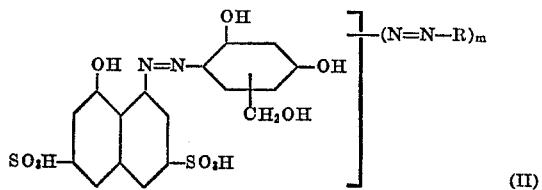

(II)

where $m$ represents 1 or 2, and those of the formula

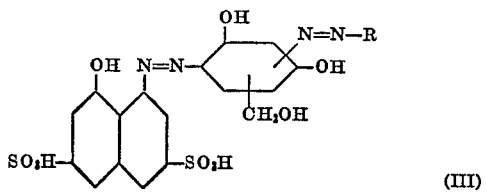

(III)

The new polyazo dyes, as exemplified by those of Formula I, can be produced by coupling a monoazo compound, formed with a diazotized 1-amino-8-hydroxynaphthalene-monosulphonic or -disulphonic acid or one of its 3'- or 4'-aminobenzoylamino derivatives and a 1,3-dihydroxyhydroxymethylbenzene, with 1 to 2 moles of a diazo compound which may be freely chosen.

Comparably good dyes are of the formula

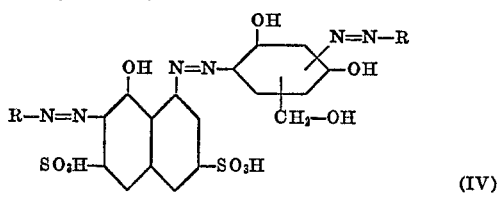

(IV)

The radicals R of the diazo compounds may be, for example, the radicals of substituted or unsubstituted aminobenzenes, aminonaphthalene and aminohydroxynaphthalene-sulphonic acids, which may be substituted by halogen such as chlorine, bromine or fluorine, or by arylamino, alkylamino, azophenyl, azonaphthyl or azodiphenyl.

The following may be named as substituents of aminobenzenes: halogen such as chlorine, bromine or fluorine, the nitro, cyano, hydroxy, carboxy or sulfo group, substituted or unsubstituted alkyl or alkoxy, a sulphonic acid amide or carboxylic acid amide group which may be substituted by alkyl or aryl, or a substituted or unsubstituted alkylsulphonyl or arylsulphonyl group. The alkyl and alkoxy radicals may bear 1 to 6, or preferably 1 to 3 carbon atoms.

If the alkyl radicals are substituted, they contain preferably halogen, such as chlorine, bromine or fluorine, the cyano or hydroxyl group, or an aryl radical; in such cases they stand for an aralkyl group, e.g. a benzyl radical. The radicals of aminobenzenes may be substituted by azoaryl, such as azophenyl, azonaphthyl or azodiphenyl. Alkyl and alkoxy signify radicals having preferably 1, 2 or 3 carbon atoms and aryl stands preferably for phenyl or naphthyl.

Examples of diazotizable amino compounds are:

1-amino-4-nitrobenzene-2-sulphonic acid
1-amino-2-methyl-4-nitrobenzene
1-amino-2-chloro-4-methylbenzene,
1-amino-2-carboxybenzene,
1-amino-3-carboxybenzene,
1-amino-4-carboxybenzene,
1-amino-2-carboxy-5-chlorobenzene,
1-amino-2-carboxy-5-nitrobenzene,
1-amino-2-methoxy-4-chlorobenzene,
1-amino-5-nitrobenzene-2-sulphonic acid,
1-amino-2-nitrobenzene-4-sulphonic acid,
1-amino-2-methylbenzene-5-sulphonic acid,
1-amino-4-methylbenzene-2-sulphonic acid,
1-amino-5-methylbenzene-2-sulfonic acid,
1-amino-2,4-dimethylbenzene-6-sulphonic acid,
1-amino-4-methylbenzene-2,5-disulphonic acid,
1-amino-4-methylbenzene-3,5-disulphonic acid,
1-aminobenzene,
1-amino-2- or -3- or -4-methylbenzene,
1-amino-2- or -3- or -4-methoxybenzene,
1-amino-2-hydroxy-3,5-dinitrobenzene,
1-amino-2-chlorobenzene,
1-amino-2-bromobenzene,
1-aminonaphthalene-4- or -5- or -6- or -7-sulphonic acid.

The preferred dyes bear 1 to 2 times the radical of a diphenylaminosulphonic acid as the meaning of R, for example the radical of a nitrodiphenylaminosulphonic acid, such as 4'-nitrophenylamino-2'-sulphonic acid and that of a corresponding diphenylamine which may bear carboxyl groups or may be free from both carboxyl and sulphonic acid groups.

Dyes of this latter type are exemplified by those of the formula

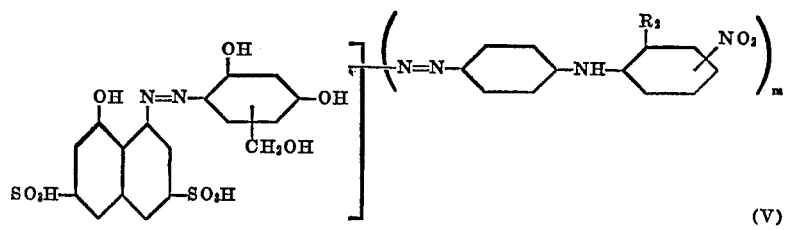

(V)

where $m$ represents 1 or 2 and $R_2$ hydrogen, —COOH or —SO$_3$H, and those of the formula

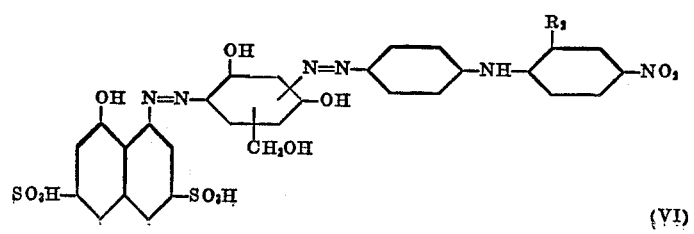

(VI)

The monoazo dye used as starting compound can be conveniently produced by reacting 1 mole of a diazotized 1-amino-8-hydroxynaphthalenesulphonic acid with 1 mole of 1,3-dihydroxyhydroxymethylbenzene in aqueous alkaline medium at a pH value of 7 to 13 and in the temperature range of 0–15° C.

The reaction with at least 1 mole of a diazo compound is generally effected in the same solution within the same pH region and temperature range.

The same conditions can be employed for the reaction with a further mole of a diazo compound, or alternatively this step can be carried out in acid medium, e.g. at a pH of 4 to 7.

The new dyes of this invention are highly suitable for dyeing leather. On grain leathers which have been tanned with various agents, have high affinity for dyes and are dyed in the moist, shaved state, they have excellent levelling properties, while on suede leather they are notable for good power of penetration and good buffing fastness. The dyeings have good acid and alkali stability, good migration fastness and good fastness to formaldehyde and pressing.

Polyazo dyes for dyeing leather are disclosed in German Pat. 904,335. They can be produced by reacting the monoazo dye, which is obtained from diazotized 1-amino-8-hydroxynaphthalenemonosulphonic or -disulphonic acid or its 3'- or 4'-aminobenzoylamino derivatives and 1,3-dihydroxybenzene, with 2 moles of any desired diazo compound, of which at least one must be a diazotized aminodiphenylaminosulphonic acid.

The dyes produced in accordance with the present invention have significantly higher solubility in water than the dyes of the said patent and, in addition show considerably greater tinctorial strength. In the coupling reaction with a 1,3-dihydroxyhydroxymethylbenzene virtually no by-products are formed which would cause interference in the application of the dyes or detract from the quality of the dyeings.

In the following examples the parts and percentages are by weight and the temperatures are expressed in degrees centigrade.

EXAMPLE 1

11 parts of 1,3-dihydroxybenzene are dissolved in a mixture of 50 parts of water and 10 parts of 30% sodium hydroxide solution. In the course of 15 minutes 10 parts of 38% formaldehyde solution are dropped into the solution. The mixture is stirred at 0–5° until the chromatogram of a sample shows that no further 1,3-dihydroxybenzene is present. The solution is then diluted with 100 parts of water and 50 parts of ice. 31.9 parts of 1-amino-8-hydroxynaphthalene-3,6-disulphonic acid are diazotized by the normal method with hydrochloric acid and sodium nitrite and coupled at pH 8–9 with 1,3-dihydroxyhydroxymethylbenzene. The monoazo dye thus formed is coupled with 61.8 parts of diazotized 4-amino-4'-nitro-2'-sulphodiphenylamine at a pH of 7 to 9. On completion of the coupling reaction the solution is adjusted acid to Congo paper with hydrochloric acid and the dark brown dye isolated by the addition of sodium chloride. It dissolves readily in water and dyes leather in dark brown shades.

EXAMPLE 2

The monoazo compound produced with diazotized 1-amino-8-hydroxynaphthalene-3,6-disulphonic acid and 1,3-dihydroxy-hydroxymethylbenzene, as addition in Example 1, is coupled with the diazotized compound of 27.4 parts of 4-amino-2',4'-dinitrodiphenylamine at pH 7. The disazo dye thus obtained is coupled with 27.7 parts of diazotized 4-amino-1,1'-azobenzene-4'-sulphonic acid at pH 9. After the reaction the solution is adjusted acid to Congo paper and the dye isolated by adding sodium chloride. It is well soluble in water and gives leather dyeings of dark yellowish brown shade.

In place of 4-amino-1,1'-azobenzenesulphonic acid, an equivalent amount of diazotized 1-aminonaphthalene-4-sulphonic acid or ortho- or para-anisidine can be employed. With these compounds brown dyes are obtained which have similarly good properties.

DYEING EXAMPLE A 100 parts of freshly tanned, neutralized chrome grain leather are dyed in a drum dyeing machine for 30 minutes in a liquor consisting of 250 parts of water at 65° and 1 part of the dye produced as described in Example 1. After 30 minutes 2 parts of an anionic fat-liquor based on sulphonated train oil are added and treatment is continued for 30 minutes. The leather is then removed, dried and finished in the normal way. A perfectly level dyeing of dark brown shade is obtained on the leather.

DYEING EXAMPLE B

In a drum dyeing machine 100 parts of calf suede are wetted back for 4 hours with 1000 parts of water and 2 parts of ammonia. The leather is then entered in a fresh bath set with 500 parts of water, 2 parts of ammonia and 10 parts of the dye described in Example 2, and is dyed from this bath for 1 hour 30 minutes at 65°. After this time 4 parts of 85% formic acid are slowly added to exhaust the bath and treatment is continued until the dyeing is fully fixed. The leather is rinsed, dried and finished on the normal lines and the nap buffed. A suede leather dyed in a very level dark yellowish brown shade is obtained.

DYEING EXAMPLE C 100 parts of chrome lamb leather are dyed for 45 minutes at 55° in a rotating drum dyeing machine containing 1000 parts of water, 10 parts of the dye specified in Example 1 and 1.5 parts of anionic sperm oil emulsion. After the slow addition of 5 parts of 85% formic acid, drumming is continued for 30 minutes for fixation of the dyeing, this being followed by the normal drying and finishing treatments. The dark brown dyeing produced in this way is of good levelness.

DYEING EXAMPLE D

The grain side of buffed, combination tanned side leather is dyed with a solution of 23 parts of the dye of Example 1 in 847 parts of water, 150 parts of ethyl glycol and 3 parts of 85% formic acid, either by spraying, padding with a plush pad or flow coating. The leather is dried under mild conditions. This method of application results in a level surface dyeing which can serve as a bottom coat for subsequent finishing with opaque pigments and synthetic binders.

The following table shows the structural composition of further dyes which can be produced in accordance with the methods of operation described in Examples 1 and 2. Column (I) gives the basis structural unit of the dyes of Formula I, namely the monoazo dye of the formula

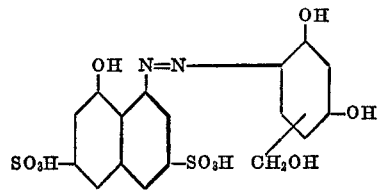

and columns (II) and (III) specify the diazo components which are suitable for the formation of the dyes of Formula I, while column (IV) gives the shade of the dyeings on leather.

| Example No: | (I) | (II) 1. Diazo component | (III) 2. Diazo component | (IV) |
|---|---|---|---|---|
| 3 | [structure: naphthalene-SO₃H with N=N to OH/OH/CH₂OH/SO₃H cyclohexane] | [structure: OH, NO₂, NH₂, NO₂ benzene] | | Brown. |
| 4 | Same as above | Same as above | [structure: NH₂-C₆H₄-NO₂] | Do. |
| 5 | do | [structure: SO₂H/NH₂ benzene linked NH to NO₂ benzene] | | Do. |
| 6 | do | [structure: NO₂/NH₂ benzene linked NH to SO₃H benzene] | | Red-brown. |
| 7 | do | Same as above | [structure: NH₂-C₆H₄-OCH₃] | Do. |
| 8 | do | do | [structure: NH₂-C₆H₄-NH-C₆H₄(SO₃H)(NO₂)] | Brown. |
| 9 | [structure: naphthalene-SO₃H/HO₃S with N=N to HO/OH/CH₂OH cyclohexane] | do | [structure: NH₂-C₆H₄-NH-C₆H₄(COOH)(NO₂)(NO₂)] | Do. |

| Example No. | (I) | (II) 1. Diazo component | (III) 2. Diazo component | (IV) |
|---|---|---|---|---|
| 10 | Same as Example 9 | [structure: aniline with NH₂, linked via NH to phenyl with NO₂, NO₂, SO₃H] | -------- | Brown |
| 11 | do | [structure: CH₃-aniline with NH₂, linked via NH to phenyl with NO₂, SO₃H] | -------- | Do. |
| 12 | do | [structure: CH₃-aniline with NH₂, linked via NH to phenyl with NO₂, SO₃H] | -------- | Do. |
| 13 | [structure: azo dye with OH, OH, CH₂OH, SO₃H, N=N, SO₃H groups on naphthalene] | [structure: aniline with NH₂, linked via NH to phenyl with NO₂, COOH] | -------- | Do. |
| 14 | Same as above | [structure: aniline with NH₂, linked via NH to phenyl with NO₂, COOH] | -------- | Do. |
| 15 | do | [structure: aniline with NH₂, linked via NH to phenyl with COOH, NO₂] | -------- | Do. |
| 16 | do | [structure: SO₃H-aniline with NH₂, linked via NH to phenyl with SO₃H, NO₂] | -------- | Do. |

| Example No. | (I) | (II) 1. Diazo component | (III) 2. Diazo component | (IV) |
|---|---|---|---|---|
| 17 | [structure: naphthalene-azo-resorcinol with HO₃S, CH₂OH, SO₃H, OH groups] | ...do... | [structure: aniline with NO₂] | Brown. |
| 18 | Same as above | [structure: diphenylamine with SO₃H, NO₂, NO₂] | | Do. |
| 19 | ...do... | [structure: diphenylamine with SO₃H, NO₂, NO₂] | | Do. |
| 20 | ...do... | [structure: diphenylamine with SO₃H] | | Do. |
| 21 | ...do... | Same as above | [structure: aminonaphthalene-SO₃H] | Do. |
| 22 | ...do... | ...do... | [structure: aminonaphthalene-SO₃H] | Do. |
| 23 | ...do... | ...do... | [structure: aniline with OCH₃] | Do. |

| Example No. | (I) | (II) 1. Diazo component | (III) 2. Diazo component | (IV) |
|---|---|---|---|---|
| 24 | Same as Example 17 | (structure: NH₂/SO₃H phenyl—NH—phenyl/NO₂,NO₂) | (structure: NH₂—phenyl—SO₃H) | Brown. |
| 25 | do | (structure: NH₂/CH₃ phenyl—NH—phenyl/NO₂,SO₃H) | do | Do. |
| 26 | do | (structure: NH₂/CH₃ phenyl—NH—phenyl/SO₃H,NO₂) | do | Do. |
| 27 | do | (structure: NH₂ phenyl—NH—phenyl/SO₃H,NO₂) | do | Do. |
| 28 | do | (structure: NH₂/CH₃ phenyl—NH—phenyl/SO₃H,NO₂) | do | Do. |
| 29 | do | (structure: NH₂/CH₃ phenyl—NH—phenyl/COOH,NO₂) | do | Brown-olive. |
| 30 | do | (structure: NH₂/CH₃ phenyl—NH—phenyl/COOH,NO₂) | do | Do. |

| Example No. | (I) | (II) 1. Diazo component | (III) 2. Diazo component | (IV) |
|---|---|---|---|---|
| 31 | Same as Example 17 | H₂N–⟨⟩–NH–⟨⟩(COOH)(NO₂)–NO₂ | ......... | Brown-olive. |
| 32 | do | H₂N–⟨⟩–NH–⟨⟩(COOH)–NO₂ | ......... | Do. |
| 33 | do | H₂N–⟨naphthalene⟩–SO₃H | H₂N–⟨naphthalene⟩–SO₃H | Olive. |
| 34 | do | H₂N–⟨⟩(SO₃H)–NO₂ | H₃CO–⟨⟩–NH₂ | Do. |
| 35 | do | H₂N–⟨⟩–NH–⟨⟩(COOH)–NO₂ | H₂N–⟨⟩–NH–⟨⟩(COOH)–NO₂ | Brown. |
| 36 | HO–⟨⟩(OH)–N=N–⟨⟩–NH–CO–⟨naphthalene⟩(OH)(SO₃H)(SO₃H) with CH₂OH | H₂N–⟨⟩–NH–⟨⟩(SO₃H)–NO₂ | H₂N–⟨⟩–NH–⟨⟩(NO₂)–COOH | Do. |
| 37 | Same as above | H₂N–⟨⟩–NH–⟨⟩(SO₃H)–NO₂ | H₂N–⟨⟩–NH–⟨⟩(SO₃H)–NO₂ | Do. |

Formulae of representative dyes of the foregoing examples are as follows:

EXAMPLE 1

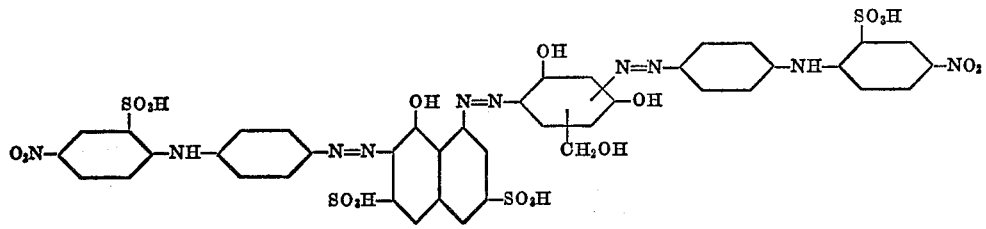

EXAMPLE 5

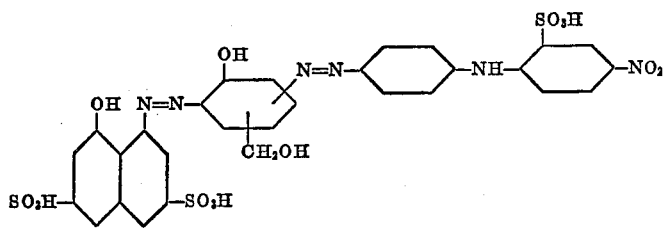

EXAMPLE 14

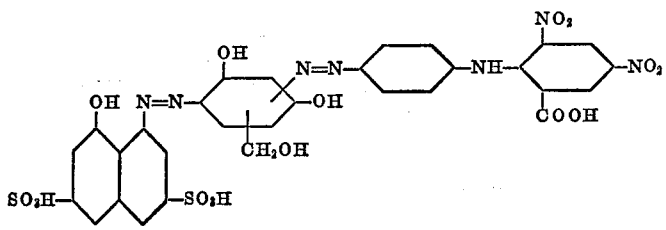

EXAMPLE 26

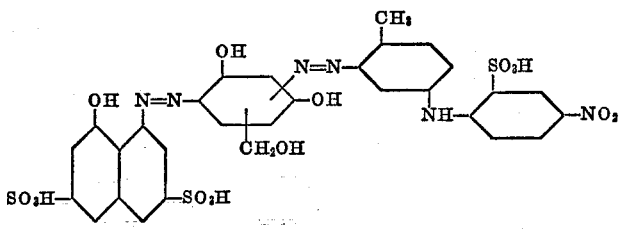

EXAMPLE 35

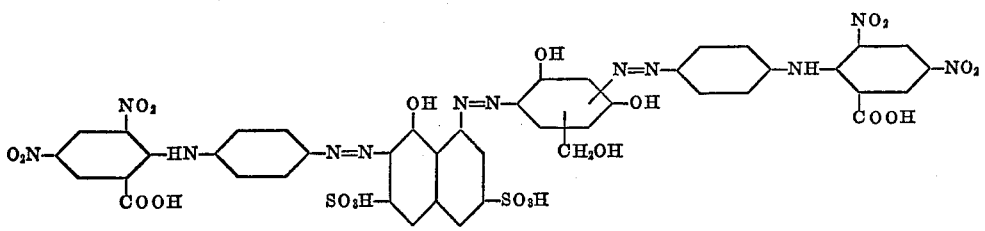

Having thus disclosed the invention what we claim is:
1. A compound of the formula

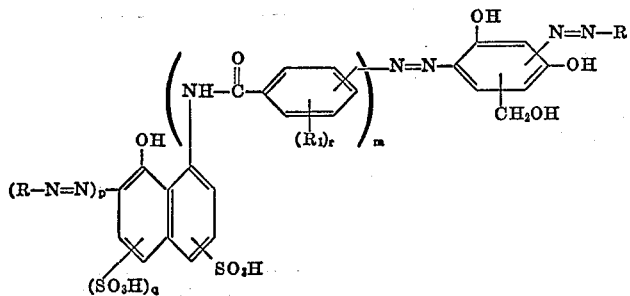

wherein
each R is independently phenyl, substituted phenyl, substituted anilinophenyl or sulfonaphthyl, wherein each substituent of substituted phenyl is independently halo, nitro, cyano, carboxy, sulfo, alkyl, substituted alkyl, alkoxy, hydroxy, alkylamino, phenylazo, 4-sulfophenyl-azo, naphthylazo, diphenylazo, sulfamoyl, substituted sulfamoyl, carbamoyl, substituted carbamoyl, alkylsulfonyl, phenylsulfonyl or naphthylsulfonyl and each substituted phenyl independently has 1 to 3 substituents, and each substituent of substituted anilinophenyl is independently nitro, carboxy, sulfo or lower alkyl and each substituted anilinophenyl independently has 1 to 4 substituents, wherein each substituent of substituted alkyl is independently halo, cyano, hydroxy, phenyl or naphthyl and each substituent of substituted sulfamoyl and substituted carbamoyl is independently alkyl, phenyl or naphthyl, and wherein each alkyl, alkoxy and alkyl chain of substituted alkyl, alkylamino and alkylsulfonyl independently has 1 to 6 carbon atoms, $R_1$ is halo, alkyl, substituted alkyl or alkoxy, wherein alkyl, alkoxy and the alkyl chain of substituted alkyl have 1 to 3 carbon atoms and each substituent of substituted alkyl is independently halo, cyano, hydroxy, phenyl or naphthyl, $m$ is 0 or 1, $p$ is 0 or 1, $q$ is 0 or 1, and $r$ is 0 or 1, with the proviso that when $m$ is 1 the ((R-azo)-hydroxymethyl-2,4-dihydroxyphenyl) azo group is meta or para to the

group.

2. A compound according to claim 1 wherein each R is independently phenyl, substituted phenyl, 4-(4-sulfophenylazo)phenyl, substituted 3-anilinophenyl, substituted 4-anilinophenyl or monosulfonaphthyl, wherein each substituent of substituted phenyl is independently chloro, bromo, nitro, carboxy, sulfo, methyl, methoxy or hydroxy and each substituted phenyl independently has 1 to 3 substituents, and each substituent of substituted 3-anilinophenyl and substituted 4-anilinophenyl is independently nitro, carboxy, sulfo or methyl and each substituted 3-anilinophenyl and substituted 4-anilinophenyl independently has 1 to 4 substituents.

3. A compound according to claim 2 wherein $R_1$ is halo, alkyl or alkoxy, wherein alkyl and alkoxy have 1 to 3 carbon atoms, $m$ is 0 or 1, and $r$ is 0 or 1.

4. A compound according to claim 3 wherein $m$ is 0.

5. A compound according to claim 4 having the formula

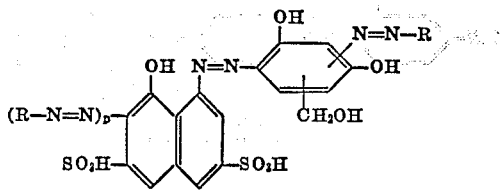

6. A compound according to claim 5 wherein $p$ is 0.

7. A compound according to claim 5 wherein each R is independently substituted 4-anilinophenyl having 1 to 3 substituents wherein each substituent is nitro, carboxy, sulfo or methyl.

8. A compound according to claim 7 having the formula

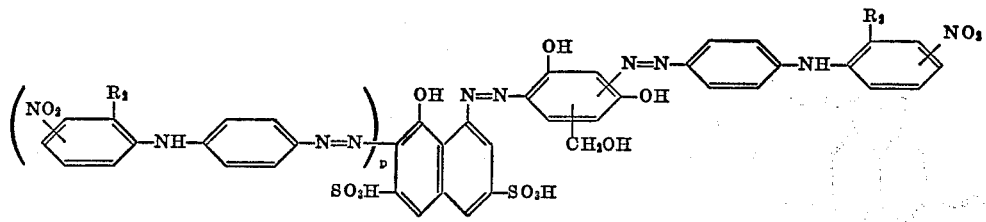

wherein each $R_2$ is independently hydrogen, carboxy or sulfo, and $p$ is 0 or 1.

9. A compound according to claim 8 having the formula

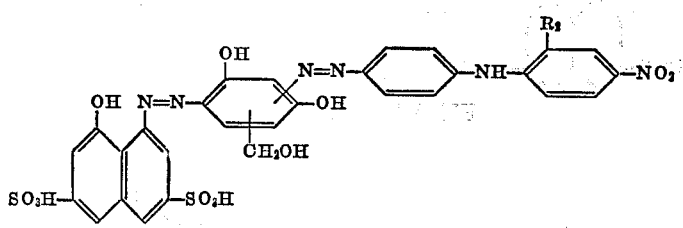

wherein $R_2$ is hydrogen, carboxy or sulfo.

10. A compound according to claim 8 having the formula

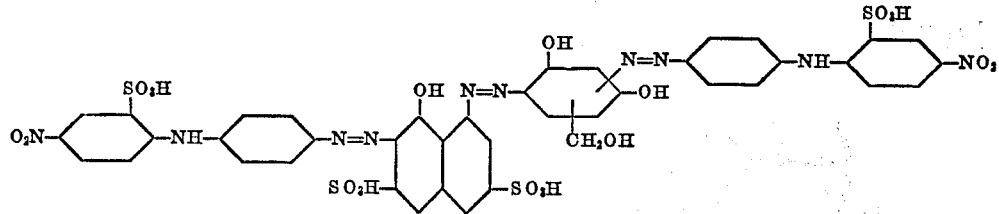

11. A compound according to claim 9 having the formula

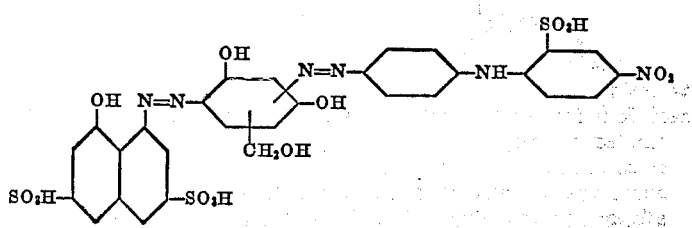

12. A compound according to claim 6 having the formula
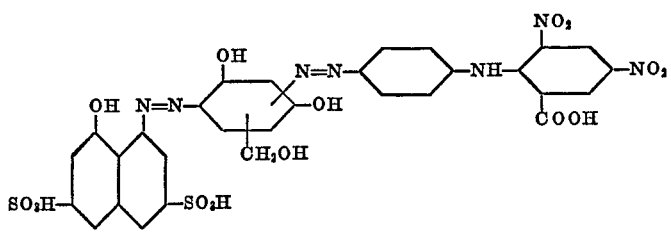
13. A compound according to claim 6 having the formula
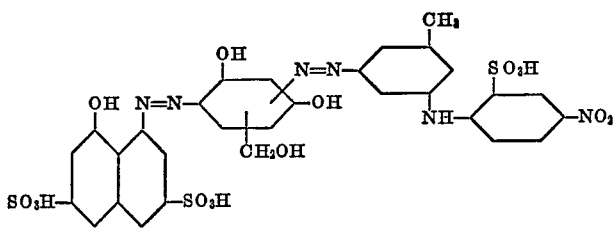
14. A compound according to claim 7 having the formula
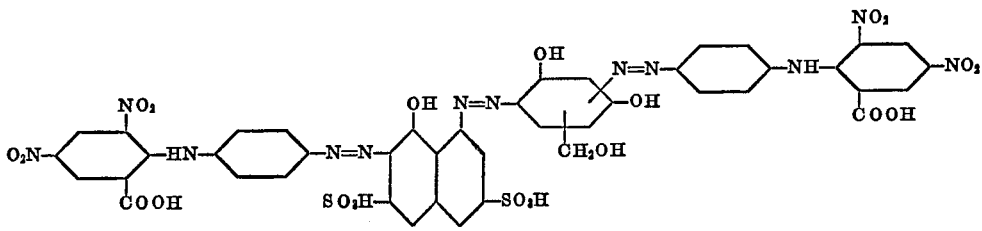
References Cited
UNITED STATES PATENTS
2,758,109   8/1956   Huss et al. _____ 260—169
3,189,593   6/1965   Wicki _____ 260—173 X
FLOYD D. HIGEL, Primary Examiner
U.S. Cl. X.R.
8—13; 117—142; 260—173, 183, 186, 191, 200, 206, 510, 518